(12) United States Patent
Liu et al.

(10) Patent No.: US 8,034,185 B2
(45) Date of Patent: Oct. 11, 2011

(54) HIGH EFFICIENCY AND HIGH THROUGHPUT CASCADE SCRUB WASH MACHINE FOR RIGID MAGNETIC RECORDING MEDIA

(75) Inventors: Youmin Liu, Palo Alto, CA (US); Rito Ligutom, Milpitas, CA (US); Kenneth Pompliano, Gilroy, CA (US); Young Bui, San Jose, CA (US); Jennifer Hou, Milpitas, CA (US); James Tuman, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 360 days.

(21) Appl. No.: 12/178,550

(22) Filed: Jul. 23, 2008

(65) Prior Publication Data

US 2010/0020666 A1   Jan. 28, 2010

(51) Int. Cl.
*B08B 1/02* (2006.01)

(52) U.S. Cl. ....... 134/9; 134/6; 15/77; 15/88.2; 15/88.3; 198/836.1

(58) Field of Classification Search ............. 15/77, 88.1, 15/88.2, 88.3; 198/734, 733, 836.1; 134/6, 134/9

See application file for complete search history.

(56) References Cited

U.S. PATENT DOCUMENTS

| 4,760,620 | A  | * | 8/1988  | Lamore ........................... 15/181 |
| 5,203,360 | A  |   | 4/1993  | Nguyen et al. |
| 5,581,837 | A  | * | 12/1996 | Uchiyama et al. ................ 15/77 |
| 6,588,043 | B1 | * | 7/2003  | Frost et al. ........................ 15/77 |
| 6,609,529 | B2 |   | 8/2003  | Olim |
| 6,625,835 | B1 | * | 9/2003  | Frost et al. ........................ 15/77 |
| 2005/0060823 | A1 | * | 3/2005 | Lord ................................. 15/77 |

* cited by examiner

*Primary Examiner* — Michael Barr
*Assistant Examiner* — Saeed T Chaudhry
(74) *Attorney, Agent, or Firm* — McCarthy Law Group (57) ABSTRACT

A disk cleaning scrub module comprising a scrub lane and a plurality of brushes that rotates and scrub washes a plurality of disks having a diameter D in the scrub lane, wherein a disk-to-disk center distance for scrub wash of the plurality of the disks is S and a ratio of S/D is greater than 1 and less than 1.6 is disclosed.

20 Claims, 8 Drawing Sheets

Disk Rotation Slippage

For No Slippage Condition: (Disk Speed/Belt Speed) = 1

If Slippage Exists: (Disk Speed/Belt Speed) < 1

Invented Belt design reduced disk rotation slippage, and increased disk rpm.

HIGH EFFICIENCY AND HIGH THROUGHPUT CASCADE SCRUB WASH MACHINE FOR RIGID MAGNETIC RECORDING MEDIA

BACKGROUND

Magnetic disks and disk drives are conventionally employed for storing data in magnetizable form. Preferably, one or more disks are rotated on a central axis in combination with data transducing heads positioned in close proximity to the recording surfaces of the disks and moved generally radially with respect thereto. Magnetic disks are usually housed in a magnetic disk unit in a stationary state with a magnetic head having a specific load elastically in contact with and pressed against the surface of the disk. Data are written onto and read from a rapidly rotating recording disk by means of a magnetic head transducer assembly that flies closely over the surface of the disk. Preferably, each face of each disk will have its own independent head.

Figure 1:
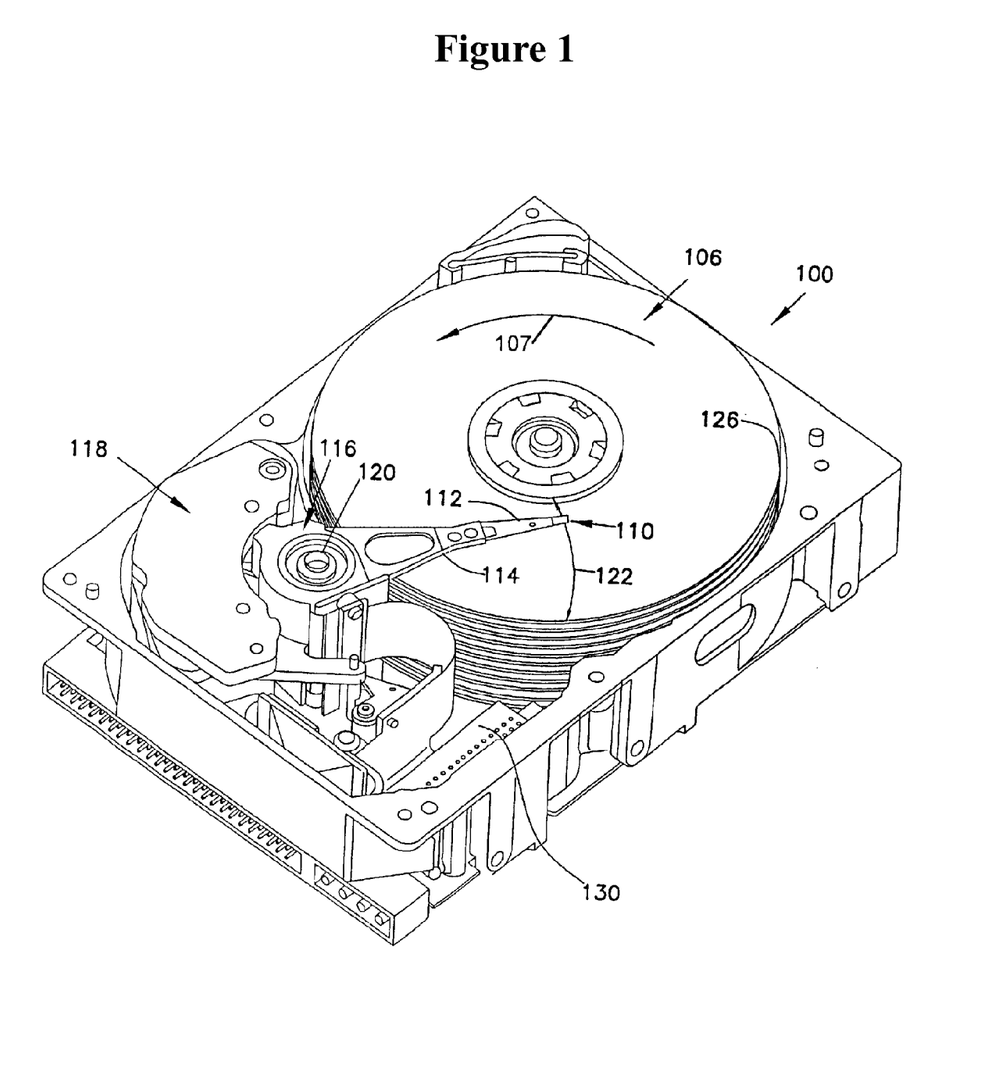
FIG. 1 illustrates a disc drive storage device.

In FIG. 1, an embodiment of a disc drive storage device 100 is illustrated. Disc drive 100 includes a disc pack 126 having storage surfaces 106 that are typically layers of magnetic material that are deposited using microstructure fabrication techniques. The disc pack 126 includes a stack of multiple discs and the read/write head assembly 112 includes a read/write transducer or head 110 for each stacked disc. The head 110 is typically formed using microstructure fabrication techniques. Disc pack 126 is spun or rotated as shown by arrow 107 to allow read/write head assembly 112 to access different rotational locations for data on the storage surfaces 106 on the disc pack 126.

Read/write head assembly 112 is actuated to move radially, relative to the disc pack 126, as shown by arrow 122 to access different radial locations for data on the storage surfaces 106 of disc pack 126. Typically, the actuation of read/write head assembly 112 is provided by a voice coil motor 118. Voice coil motor 118 includes a rotor 116 that pivots on axle 120 and an arm 114 that actuates the read/write head assembly 112. Disc drive 100 includes electronic circuitry 130 for controlling the operation of the disc drive 100 and transferring data in and out of the disc drive.

Typically, the disc drive head 110 slides over the storage surface 106 in the disc drive 100 as illustrated. If there are particles of a large enough dimension between the sliding surfaces, then there is an increased risk that one of the sliding surfaces may be damaged during operation. In modern disc drives a critical dimension can approach 5 nanometers between the head 110 and the storage surface 106. Particles can cause damage and need to be removed from the sliding surfaces before assembly of the disc drive 100.

Figure 2:
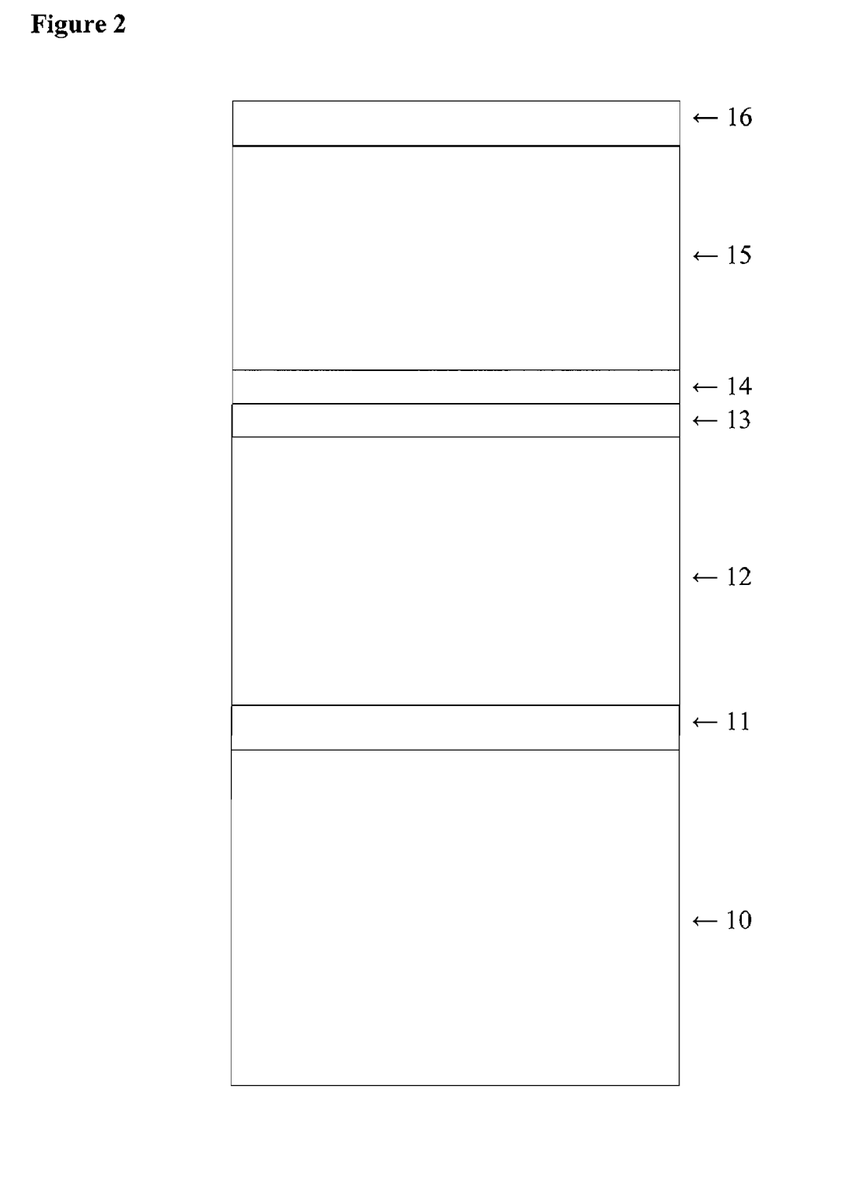
FIG. 2 schematically shows a film structure of a magnetic recording medium.

A sectional view of a disk recording medium, which is generally shaped like a disc, is shown in FIG. 2. Even though FIG. 2 shows sequential layers on one side of the non-magnetic substrate 10, it is to sputter deposit sequential layers on both sides of the non-magnetic substrate.

Adverting to FIG. 2, a sub-seed layer 11 is deposited on substrate 10, e.g., a glass or glass-ceramic substrate. Subsequently, a seed layer 12 is deposited on the sub-seed layer 11. Then, an underlayer 13, is sputter deposited on the seed layer 12. An intermediate or flash layer 14 is then sputter deposited on underlayer 13. Magnetic layer 15 is then sputter deposited on the intermediate layer, e.g., CoCrPtTa. A protective covering overcoat 16 is then sputter deposited on the magnetic layer 15. A lubricant topcoat (not shown in FIG. 2 for illustrative convenience) is deposited on the protective covering overcoat 16.

The disk is finely balanced and finished to microscopic tolerances. Take the smoothness of its surface, for example. The drive head rides a cushion of air at microscopic distances above the surface of the disk. So, the surface cannot be too smooth, or the drive lead will end up sticking to the disk, and it cannot be too rough either, or the head will end up getting caught in the microscopic bumps on the surface.

It is considered desirable during reading and recording operations to maintain each transducer head as close to its associated recording surface as possible, i.e., to minimize the flying height of the head. This objective becomes particularly significant as the areal recording density increases. The areal density (Mbits/in$^2$) is the recording density per unit area and is equal to the track density (TPI) in terms of tracks per inch times the linear density (BPI) in terms of bits per inch.

Using chemical and mechanical methods to remove contaminants from the surface of the rigid magnetic medium after the mechanical texture process are proven methods to effectively remove contaminants which degrade the performance of the rigid disk medium. Some larger contaminants in the range of 1-5 microns are easier to remove, but smaller contaminants in the range of 0.1 micron to 1.0 micron are much more difficult to remove.

Contaminants on the surface of the disk can degrade the performance of the rigid magnetic medium. Contaminants that protrude above the flying height of the read/write heads can cause these heads to crash—just like an airplane hitting a small hill. Contaminants that are below the flying height of the read/write heads, but are large enough, will cause a loss of magnetic signal. Some contaminants prevent the succeeding thin film metals (as they are applied through the sputtering process) from adhering completely onto the NiP surface. All these forms of contamination directly lead to magnetic performance failure at the drive.

High area density rigid magnetic medium requires high magnetic track density and high bits per inch. To satisfy these basic magnetic designs, the space between the head and the rigid magnetic medium must be reduced to nanometer level. For example the flying height of 100 Gb/sq-in drive now is around 40 to 50 angstroms. This requires the rigid magnetic medium to have very clean surfaces with very few sub-micron particles and contaminants. This is a very huge challenge because of the very small sizes of the sub-micron particles and contaminants.

In recent years, considerable effort has been expended to achieve high areal recording density. In particular, the requirement to further reduce the flying height of the head imposed by increasingly higher recording density and capacity renders the disk drive particularly vulnerable to head crash due to accidental glide hits of the head and media. To avoid glide hits, a smooth defect-free surface of data zone is desired. The direct result of these demands is tending towards low yield due to less defect tolerance at the surface of the media. Thus, it is desired to arrive at an improved and efficient mechanism for scrubbing/burnishing/polishing the surface of the discs to produce defect-free surface.

SUMMARY OF THE INVENTION

The present invention relates to a cascade scrub wash machine for magnetic recording media, such as thin film magnetic disks having smooth surfaces for data zone.

This invention relates to a disk cleaning scrub module comprising a scrub lane and a plurality of brushes that rotates and scrub washes a plurality of disks having a diameter D in the scrub lane, wherein a disk-to-disk center distance for scrub wash of the plurality of the disks is S and a ratio of S/D is greater than 1 and less than 1.6. Preferably, at least a portion of the brushes have a core that is a step core having two diameter sizes along the length of the core such that a larger diameter section of the brush pushes down with greater force on the disk than a smaller diameter section of the brush during scrub wash of the disk by the brush, thereby rotating the disk. The disk cleaning scrub module further comprises a drive belt having a groove to allow for a snug fit with the outer diameter (OD) of the plurality of disks. Preferably, a linear velocity of the drive belt and a rotation speed of the brush having a step core are such that rotation slippage of the disk on the drive belt is substantially eliminated. Preferably, the linear velocity of the drive belt and the rotation speed of the brush are adjusted by software control to substantially eliminate slippage of the disk on the drive belt. The disk cleaning scrub module further comprises a transfer chain having advance fingers positioned such that the ratio of S/D is greater than 1 and less than 1.5. Preferably, at least a portion of the advance fingers comprise at least two rollers. Preferably, a single scrub lane scrub washes at least 5 disks simultaneously. Preferably, the brushes are mounted on a mandrel. Preferably, the mandrel comprises a hollow cross-section in the center of the mandrel to allow a fluid to flow through the mandrel and exit through openings on a surface the mandrel.

Another embodiment relates to a method of cleaning a plurality of disks in a disk cleaning scrub module comprising a scrub lane and a plurality of brushes that rotates and scrub washes a plurality of disks having a diameter D in the scrub lane, wherein a disk-to-disk center distance for scrub wash of the plurality of the disks is S, the method comprises positioning the disk in the scrub lane such that a ratio of S/D is greater than 1 and less than 1.6 and rotating the brushes.

Additional advantages of this invention will become readily apparent to those skilled in this art from the following detailed description, wherein only the preferred embodiments of this invention is shown and described, simply by way of illustration of the best mode contemplated for carrying out this invention. As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

Almost all the manufacturing of the disks takes place in clean rooms, where the amount of dust in the atmosphere is kept very low, and is strictly controlled and monitored. The disk substrates come to the disk fabrication site packed in shipping cassettes. Typically, before sputtering (or post wash cleaning) the disk substrate is called a "substrate" and after sputtering the disk media is call a "disk." For certain types of media, the disk substrate has a polished nickel-coated surface. The substrates are preferably transferred to process cassettes to be moved from one process to another. Preferably, the cassettes are moved from one room to another on the specific designed convey system with the class 10 environment condition automatic guided vehicles to prevent any possible contamination due to human contact.

The typical longitudinal magnetic recording medium (LMR) and perpendicular record magnetic medium (PMR) processes are described below. The cleanness of the substrate itself is rather important in manufacturing high quality disk media. An unclean substrate can cause serious disk quality problems such as glide avalanche and disk crash. The contaminations, generally speaking, on the top surface of the disk can be removed after sputtering of the sputtered layers on the substrate. But the hidden "dirt" on the surface of the substrate will be covered by the sputtered layers and would not be removable.

Typical LMR magnetic media process steps for the front end processes include: (1) kitting; (2) laser index marking (LIM); (3) mechanical texture; (4) cleaning; (5) laser texture and (6) sputtering. Typical PMR magnetic media front end process steps are the same as those of the LMR magnetic media except the process does not include mechanical texture.

The term "kitting" typically refers to the first process of making media, during which the substrate is carried by a process cassette and kitting is done by putting magnetic identification or "mark" into the RF tag of the cassette. Then, each cassette can be traced and the substrate position in the cassette identified. After kitting, the substrate undergoes laser index marking by a LIM standard for laser index marking. The laser index mark is located in the inner diameter (ID) of the substrate or disk and is used for alignment in a drive assembly. The cleaning step of the LMR and PMR media manufacturing processes is typically undertaken in several sub-steps, such as soaking with ultrasonic tanks, chemical conditioning tanks, deionized (DI) water rinsing, scrubbing, rinsing, megsonic cleaning and drying. This invention primarily relates to the scrubbing portion of the cleaning step.

The first step in preparing a disk for recording data is mechanical texturing by applying roughness and grooves to the polished surface of the substrate. This helps in depositing a magnetic material on the substrate. During the texturing process, small amounts of nickel get removed from the surface of the disk and remain there. To remove this, the substrate is usually scrubbed and washed. Also, techniques for polishing the surface of the non-magnetic substrate of a recording medium use slurry polishing, which requires scrub and wash treatment. Thus, disk substrates are scrubbed and washed after texturing and polishing. However, scrub and wash defects could be one of the top yield detractors.

The next step is laser texturing of the landing area (preferably, a 2-4 mm band near the center) where the read head comes to rest. Laser texturing is done by creating microscopic bumps, using a laser. This prevents the head from clinging to the disk surface when the disk is spinning.

A final cleaning of the substrate is then done using a series of ultrasonic, megasonic and quick dump rinse (QDR) steps. At the end of the final clean, the substrate has an ultra-clean surface and is ready for the deposition of layers of magnetic media on the substrate. Preferably, the deposition is done by sputtering.

Sputtering is perhaps the most important step in the whole process of creating recording media. There are two types of sputtering: pass-by sputtering and static sputtering. In pass-by sputtering, disks are passed inside a vacuum chamber, where they are bombarded with the magnetic and non-magnetic materials that are deposited as one or more layers on the substrate. Static sputtering uses smaller machines, and each disk is picked up and sputtered individually.

The sputtering layers are deposited in what are called bombs, which are loaded onto the sputtering machine. The bombs are vacuum chambers with targets on either side. The substrate is lifted into the bomb and is bombarded with the sputtered material.

Sputtering leads to some spike formation on the substrate. These spikes need to be removed to ensure that they do not lead to the scratching between the head and substrate. Thus, a lube is preferably applied to the substrate surface as one of the top layers on the substrate.

Once a lube is applied, the substrates move to the buffing/burnishing stage, where the substrate is polished while it preferentially spins around a spindle. After buffing/burnishing, the substrate is wiped and a clean lube is evenly applied on the surface.

Subsequently, the disk is prepared and tested for quality thorough a three-stage process. First, a burnishing head passes over the surface, removing any bumps (asperities as the technical term goes). The glide head then goes over the disk, checking for remaining bumps, if any. Finally the certifying head checks the surface for manufacturing defects and also measures the magnetic recording ability of the substrate.

A technique for buffing/burnishing is tape burnishing (buffing). However, the technique is attendant with numerous disadvantages. For example, it is extremely difficult to provide a clean and smooth surface due to debris formed by mechanical abrasions.

Tape burnish and tape wipe processes in which the tape moves orthogonal to the burnishing object without any rotational degree of freedom of the burnishing tape cannot generally effectively remove the particles on the surface of the disk. These particles cause failure and/or decreased performance of the magnetic disc drives. This problem can be especially critical in magnetic discs made by the servo pattern printing process. This is because the particles on the surface can damage the stamper, which sequentially affects the quality of the printed discs. This invention allows the buffing/burnishing process to be improved to meet the demands of high storage density and low fly height criteria.

The cleaning apparatus for burnishing asperities or defects from the surfaces of an article, e.g., a rigid magnetic disk, could use an abrasive burnishing tape, a pad, a cloth, a scrubber or any burnishing object that contacts and cleans the surface of the object. If the object is a disk, then the disk preferably rotates on a spindle while the burnishing object contacts the surface of the disk. The burnishing object could be held stationary at one location on the surface of the disk or moved during the burnishing process. The burnishing object could contact the article by air directed to the burnishing object. On the other hand, the burnishing object may not contact the article by air directed to the burnishing object. The trajectory of the burnishing object relative to the burnished disc can be controlled to optimize the particle removal effectiveness.

The embodiments of this invention disclose a new chemical and mechanical cleaning process, with a new re-designed scrub station which results in higher disk throughput which gives manufacturing an extra two million more disks per quarter capacity, and an improved wash tool cleaning capability which generates higher over-all cumulative yields while maintaining the same wash tool size and footprint. The embodiments of the invention include: 1) a new transfer chain design that allows for closer placement of disks within the cascade scrub module; 2) a new step core design with shorter lengths to accommodate the extra scrub cleaning stations; 3) a new step core design that allows for more positive frictional forces to improve the disk rotation; 4) a new drive belt design that allows for less disk rotation slippage; and 5) a new bearing system that allows for additional brush rotation speed.

The optimized disk rotation process allows the disk rotation speed to be increased from about 200 rpm to about 300 rpm. The optimized brush rotation process allows for the brush rotational speed to be increased from 400-600 rpm to 800-1000 rpm. This optimized mechanical cleaning process allows for more cleaning cycles in the same amount of time. Balancing this extra cleaning cycles with the process time, allows for faster tool output (higher output per hour). In the embodiments of this invention, all possible working space within the scrubber module such as Oliver 2000 tool has been utilized to achieve added mechanical cleaning. The embodiments of this invention have been completely reduced to practice in at a manufacturing facility in Milpitas, Calif.

The embodiments of the invention relate to a chemical and mechanical cleaning process for the rigid magnetic medium comprise obtaining a desirable disk-to-disk gap to disk diameter or A to B ratio within a scrub station which fully utilize the machine size and machine footprint. The desired ratio of "disk-to-disk gap to disk diameter", or A/B ratio, within the current scrub station of the Oliver 2000 machine greatly improved the cleaning capability of the wash tool. By the embodiments of the invention, the disk-to-disk gap has been successfully decreased to allow for more chemical and mechanical cleaning of the disks within the same scrub bed length of about 20-22 inches. For example, for a disk diameter (D) of 95 mm, by decreasing the disk-to-disk center distance (S) from 6 inches to 4.5 inches, ratio of S/D was decreased from 1.6 to 1.2. In the embodiments of this invention, the preferred ratio of 8/D is less 1.6, more preferably, 1 to 1.59, even more preferably, 1 to 1.5, 1 to 1.4, 1 to 1.3, and most preferably greater than 1 but equal to or less than 1.2.

The embodiments of the invention also relates to using a higher brush rotational speed, and higher disk rotational speed. Increased brush rotational speed increases the chemical and mechanical scrubbing and cleaning action for the same amount of process time. Increased disk rotational speed increases the amount of surface area presented to the rotating brushes for chemical and mechanical scrubbing and cleaning action for the same amount of process time.

Other embodiments of the invention relate to spraying a chemical during the scrubber process (rotating brush and rotating disk) to remove contaminants from the surface of the disk, e.g., spraying deionized (DI) water to the top of the rotating brushes and rotating disks, and flushing DI water through the center of the brush mandrels, to rinse off the cleaning chemicals and surface contaminants; soaking the media or disks in DI water tank; and processing disk through the rest of the rigid media processes.

The ratio of "disk-to-disk gap" to "disk diameter" was reduced by utilizing a new designed transfer chain that utilizes a single advance finger that combines the function of two separate advance fingers. The new advance finger was more efficient with space utilization, is more robust and more stable. Furthermore, the ratio of "disk-to-disk gap" to "disk diameter" was reduced by utilizing a new designed brush step cores for the polymer brushes. The new brush step cores were designed to be shorter in length, but still covering the whole diameter of the disk. As a result, a higher disk rotational speed was achieved by utilizing a new designed brush step cores for the polymer brushes. The new brush step cores were designed to have larger diameter at the driving section of the cores. This larger diameter increased the frictional forces to the disk thus enabling the disk to rotate more easily.

Furthermore, a higher disk rotational speed was achieved by utilizing a new drive belt designed to allow for less disk rotation slippage. The drive belt has a v-groove with dimensions designed to allow for a snug fit with the outer diameter (OD) of the disk. This snug fit at the OD of the disk increases the area of contact between the OD of the disk and the drive belt, thus increasing the frictional forces that help to increase the disk rotation.

Generally, the asperities on the surface of the scrub washed article are less than 5 nm, preferably less than 4 nm, most preferably less than 3 nm. The surface parameters can be measured by atomic force microscope (AFM) such as NanoScope®. The statistics used by the AFM are mostly derived from ASME B46.1 ("Surface Texture: Surface Roughness, Waviness and Law") available from the American Society of Mechanical Engineers, which is incorporated herein by reference.

The parameters for measuring surface roughness due to asperities are the following:

(1) Average surface roughness ($R_a$): Arithmetic average of the absolute values of the surface height deviations measured from a mean plane. The value of the mean plane is measured as the average of all the Z values within an enclosed area. The mean can have a negative value because the Z values are measured relative to the Z value when the microscope is engaged. This value is not corrected for tilt in the plane of the data; therefore, plane fitting or flattening the data will change this value.

$$R_a = [|Z_1| + |Z_2| + \ldots + |Z_n|]/N$$

(2) RMS: This is the standard deviation of the Z values within the enclosed area and is calculated as $$RMS = [\{\Sigma(Z_i - Z_{avg})^2\}/N]^{1/2}$$

where $Z_{avg}$ is the average of the Z values within the enclosed area, $Z_i$ is the current Z value, and N is the number of points within the enclosed area. The RMS value is not corrected for tilt in the plane of the data; therefore, plane fitting or flattening the data will change this value.

(3) Maximum height ($R_{max}$): This the difference in height between the highest and lowest points on the surface relative to the mean plane.

(4) $R_z$: This is the average difference in height between five highest peaks and five lowest valleys relative to the mean plane.

All of surface parameters would be improved remarkably after the scrub wash process of this invention. For example, the surface roughness average $R_a$ can be reduced from about 3 nm to about 0.3 nm. The surface parameter RMS can be decreased from about 4 nm to about 0.4 nm. The surface parameter $R_{max}$ can be reduced from about 15 nm to about 2 nm. The surface parameter $R_z$ can be reduced from about 9 nm to about 2 nm.

In other embodiments, a moving tape could be applied to the surface with a roller forcing the tape to contact the surface or there is an additional wiping process. The tape could have 0.3 micron alumina slurry on a tape of a polyester material. The ceramic slurry would cut the asperity of disk surface. The contact force on the disk could be about 0.8 lb. measured by force gage. The spindle rotation speed of disk could be about 600 rpm. The tape moving speed could be about 8 inch per minute. The contact time could be about three seconds or more. After burnishing, a scrub wash and wiping process could be carried out with a woven fabric polyester material. The wiping time could be about three second with a disk rotation speed of about 400 rpm and tape speed of about 4 inch per minute. The wiping process would prepare a clean surface for AFM measurement.

In other embodiments, the scrub and wash process, which could precede or follow the burnishing process, and these processes could be used before or after the thin film sputter deposition on the surface of a non-magnetic substrate. The method of this invention can be used on a non-magnetic substrate comprising glass, NiP/aluminum, metal alloys, plastic/polymer material, ceramic, glass-ceramic, glass-polymer and other composite materials.

The scrub and wash process could use acidic cleaners that have pH range 1 to 5, preferably, 1.5 to 4 used to treat a fresh surface of the rigid disk just following the mechanical texture. The acidic cleaner could be sprayed on the disk surface for a short time then followed by DI water spraying. Optionally, after the acidic cleaner treatment the disk could soaked in the alkaline soap solution.

In other embodiments of this invention the variations in buffing, i.e., polishing, the surface that can employed are any one or more of the methods shown below.

Mechanical Polishing

Persons skilled in this art would recognize that the variables that control mechanical polishing are: (a) substrate surface initial condition: roughness, waviness, substrate size, substrate shape and grain size; (b) polishing slurry size ($Al_2O_3$, $CeO_2$, $SiO_2$, etc) and coolant (inorganic and organic solutions with lubricant); (c) polishing time and surface finishing; and (d) washing and cleaning substrate surface Chemical Polishing Persons skilled in this art would recognize that the variables that control mechanical polishing are: (a) substrate surface initial condition: roughness, waviness, substrate size, substrate shape and grain size; (b) polishing solutions compositions and their ability to dissolve the substrate materials; (c) the composition consists of a combination of different acids (e.g. nitric, sulfuric, hydrochloric, phosphoric, chromic, acetic) or organic solutions (e.g. methanol, glycerin, ethyldiglicol), also containing some added electropositive ions. E.g., polishing of Al: small amounts of Cu will create additional local cathodes by deposition on Al, stimulating the polishing process. Adding some oxidants has a function as depolarization agents.

Electrochemical Polishing

Persons skilled in this art would recognize that the variables that control electrochemical polishing are: (a) the external source of electricity to produce the anodic current density and voltage; (b) the electrolyte temperature; (c) the time duration of electropolishing; (d) the cathodic materials; in general, the cathode surface should be many times larger than that of electropolished substrate and different materials are used as cathodes depending on the applied electrolyte; and (e)

agitation, which can eliminates the undesired concentration of the dissolved material at the substrate. Agitation can improve the supply of fresh electropolishing electrolyte to substrate surface. Agitation can prevent local heating and release gas bubbles from the polished surface to avoid pitting on the substrate surface.

CMP (Chemical Mechanical Polishing) used in semiconductor wafer polishing. Persons skilled in this art would recognize that the variables that control the CMP process.

Examples

Figure 3:
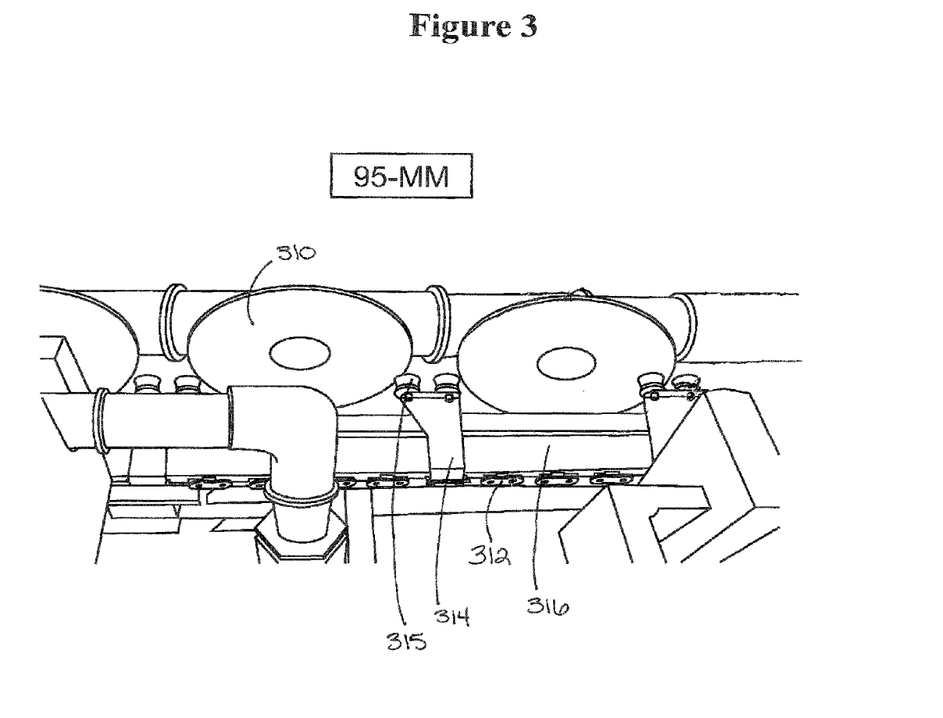
FIG. 3 shows a 95-mm diameter disk transfer chain in which the advance fingers were two V-Rollers each.
Figure 4:
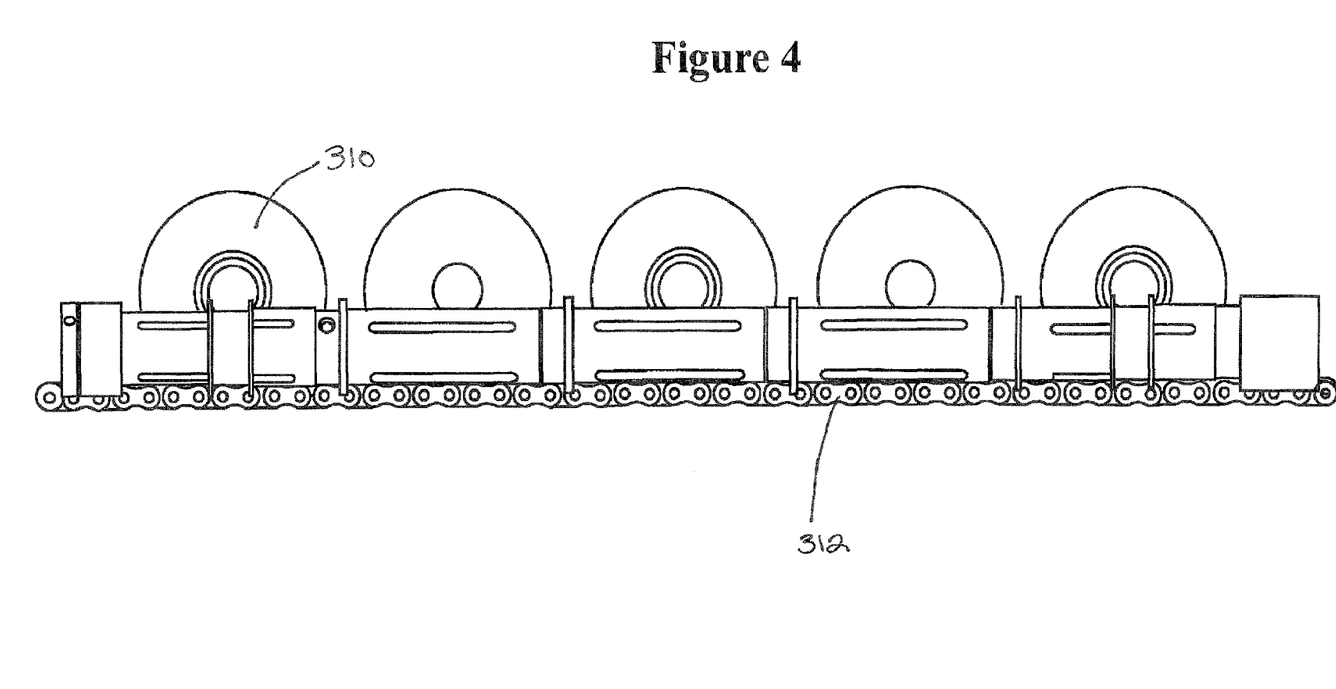
FIG. 4 shows a sketch of the disks and mandrel configuration of an embodiment of this invention.

In the current cascade scrub module of the Oliver 2000 machine, the transfer chain was re-designed to allow for reduced ratio of disk-to-disk gap to disk diameter. FIG. 3 shows a 95-mm diameter disk 310 transfer chain 312 in which the advance fingers 314 were two V-rollers 315 each. This design reduced the disk-to-disk gap between the disks 310. For a 65-mm disk (not shown), each of the advance fingers 314 had a single V-roller 315. FIG. 4 shows a sketch of the disks 310 and mandrel configuration of an embodiment of this invention. The embodiment of the invention shown in FIGS. 3 and 4 have a new chain 312 design, a new mandrel design, and a software to control the movement of the disk 310 through the scrub wash machine.

Figure 5:
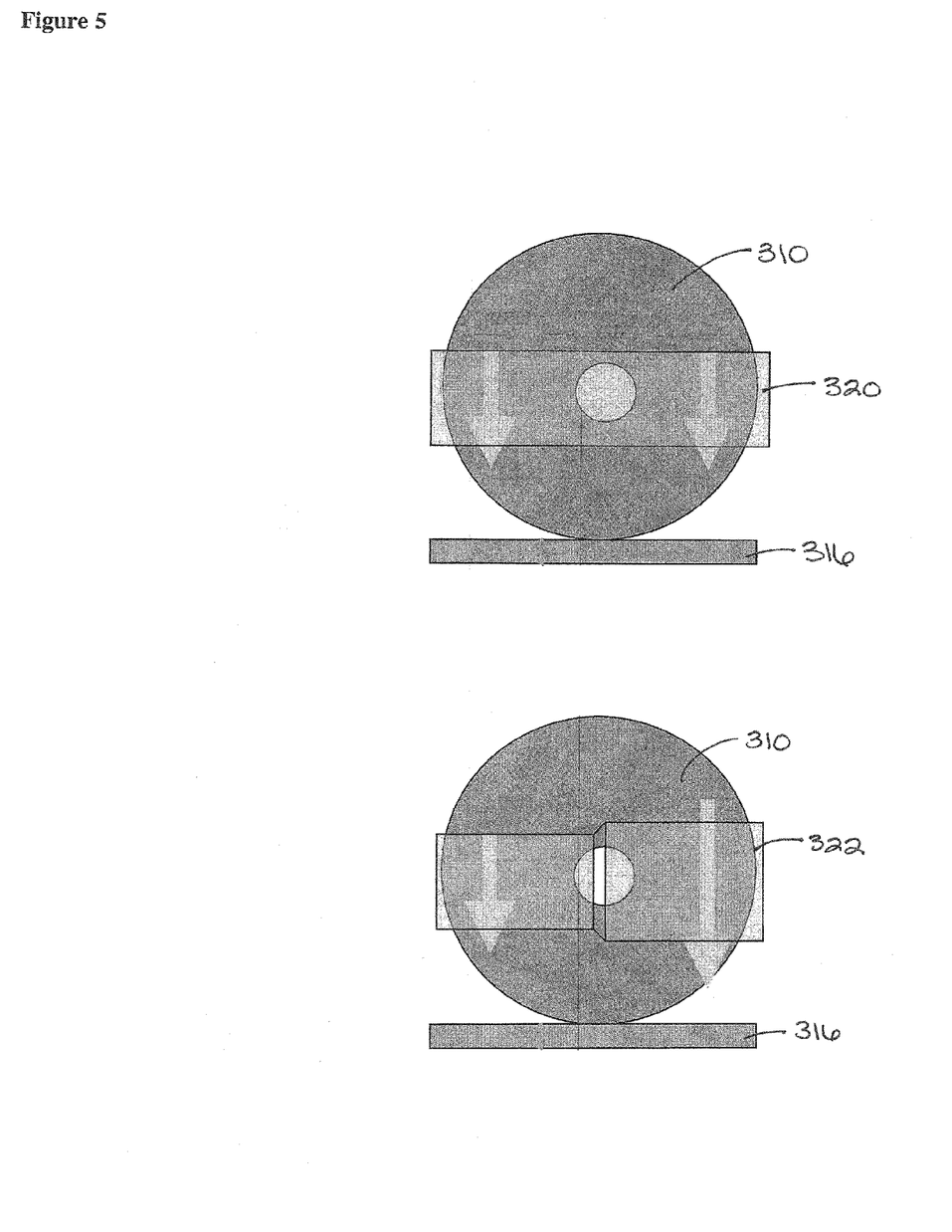
FIG. 5 shows the mechanism to cause rotation of the disk using a step core brush.

Another feature of the invention is a new brush having a step core. This brush 322 has been designed to allow for reduced disk-to-disk gap between disks 310; and allows for more positive frictional forces to help rotate the disk 310 as demonstrated by the schematics in FIG. 5, wherein the top schematic shows a straight core brush 320 which does not produce rotation of the disk 310 while the bottom schematic shows a step core brush 322 that causes the disk 310 to rotate due to unequal forces applied on the disk 310 by the smaller and larger diameter portions of the step core brush 322. When the brush 320 is a straight brush, the force generated by rotating the brush 320 on the disk 310 are equal on the left and right sides of the disk 310 from the center of the disk 310. Thus, the sum of the torque is zero. Thus, the disk 310 does not rotate. On the other hand, when the brush 322 has a step core, the larger diameter portion of the brush 322 pushes down with a bigger force than the smaller diameter portion of the brush 322, generating a torque around the center of the disk 310 and causing the disk 310 to rotate.

Figure 6:
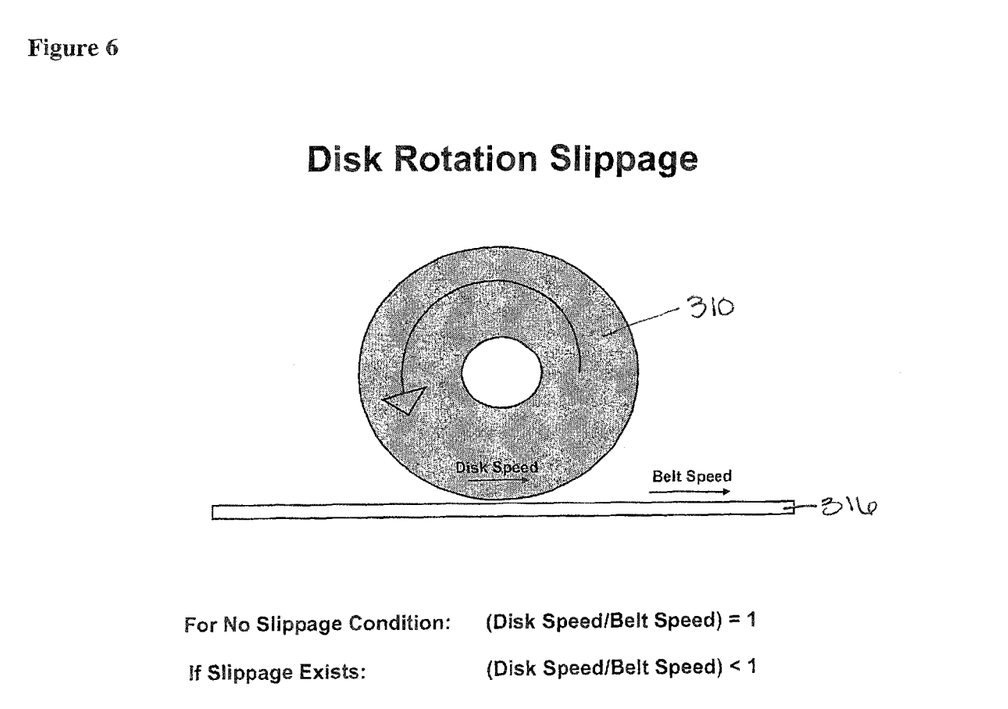
FIG. 6 shows slippage and no slippage conditions for disk rotation on the drive belt.

Preferably, the rotation of the disk 310 should be such that the linear velocity at the perimeter of the disk 310 is equal to the linear velocity of the drive belt 316 shown in FIG. 3 on which the disk 310 rests perpendicularly to prevent rotation slippage of the disk 310 on the drive belt. When the linear velocity of the perimeter of the disk 310 is not equal to the linear velocity of the drive belt 316, then rotation slippage could occur. See FIG. 6.

Figure 7:
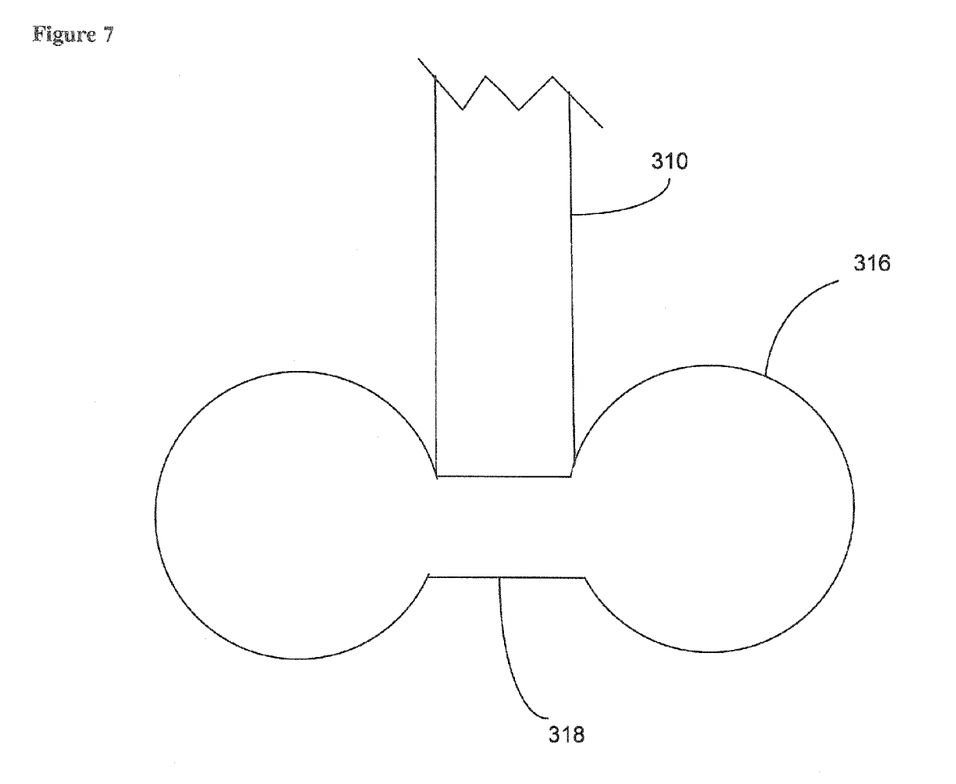
FIG. 7 shows the cross-sectional view of the novel drive belt of the embodiments of the invention.

One embodiment of the invention relates to a new drive belt 316 that has been designed to allow for less disk 310 rotation slippage. FIG. 7 shows the cross-sectional view of the novel drive belt 316 of the embodiment of the invention. The drive belt 316 has a v-groove 318 with dimensions designed to allow for a snug fit with the outer diameter (OD) of the disk 310. This snug fit at the OD of the disk 310 increases the area of contact between the OD of the disk 310 and the drive belt 316, thus increasing the frictional forces that help to increase the disk rotation.

Experimental Results

Figure 8:
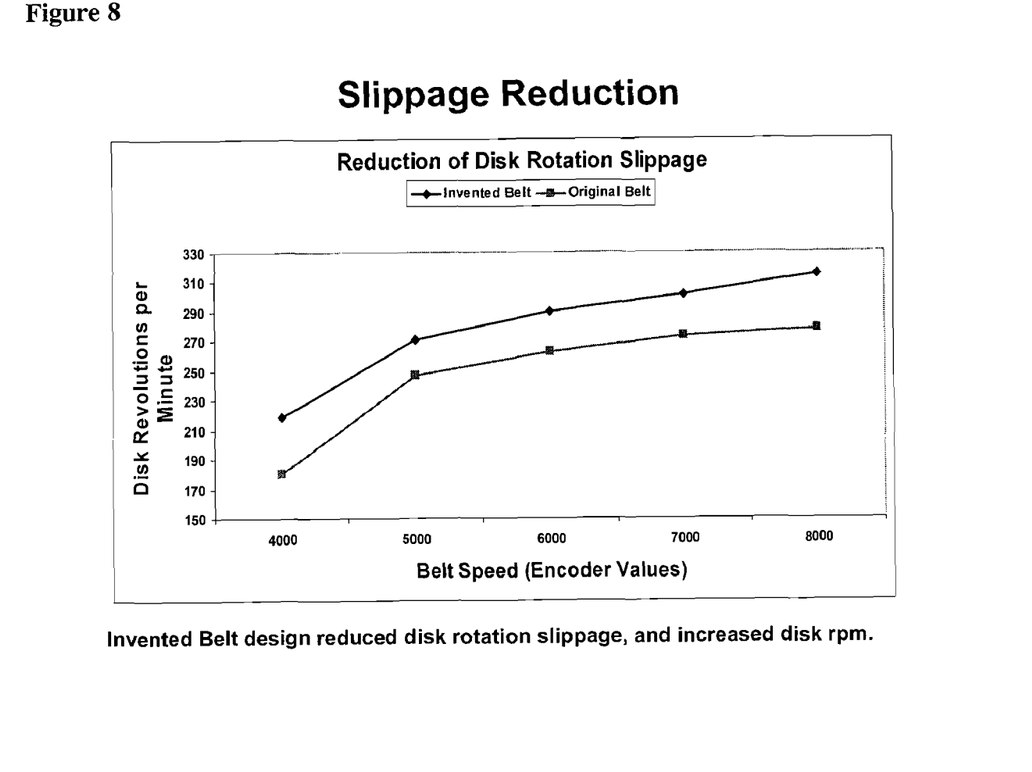
FIG. 8 graphically illustrates reduction in disk rotation slippage by the use of the novel drive belt of the embodiments of the invention.

FIG. 8 shows the novel drive belt increases the rpm of the rotation of the disk in the scrub wash machine with the disk rotating along its edge, standing vertically in the v-groove of the drive belt as compared to the rpm of the rotation of the disk in a scrub wash machine have a conventional drive belt without a v-groove. As a result of the increased rpm of the rotation of the disk, the linear velocity at the perimeter of disk was closer to the linear velocity of the drive belt, resulting in a reduced disk rotation slippage. This in turn, results in improved yield of the scrub wash process as demonstrated with data shown below. The novel drive belt could be an extruded rubber belt, for example.

Table 1 (below) shows the improvement in yield of acceptable disks by the

|  | work_cell | gld_qty_in | gld_yield | crt_qty_in | crt_yield | cum_yield |
| --- | --- | --- | --- | --- | --- | --- |
| 4 Stn | OW502 | 17373 | 83.84 | 14566 | 89.32 | 74.88 |
| 5 Stn | OW502 | 22206 | 85.01 | 18877 | 90.32 | 76.78 | high efficiency, high throughput 5 station cascade scrub wash machine of the embodiments of this invention versus a conventional 4 station cascade scrub wash machine, wherein both the novel 5 station cascade scrub wash machine with 5 wash stations per scrub wash lane and the conventional 4 station cascade scrub wash machine with 4 wash stations per scrub wash lane have the same footprint dimensions. The disk diameter (D) was 95 mm in both the 4 and 5 station scrub wash machines. For a disk diameter of 95 mm, the disk-to-disk center distance (S) was 6 inches in the 4 station scrub wash machine and 4.5 inches in the 5 station scrub wash machine. Thus, the ratio of S/D was 1.6 and 1.2 for the 4 and 5 station scrub wash machines, respectively.

The terms used in Table 1 are as follows:

The term "work_cell" means a specific process line to be assigned to do evaluation test.

The term "gld_qty_in" means the number of disks tests for the glide yield test.

The term "gld_yield" means glide yield, which is defined as the number of the disk passing glide test divided by the number of disks tested for the glide test multiple by 100. Glide test is a mechanical test to screen out the defect which fall outside a defined specification. For example, the current glide test requires flying a head 50 angstroms above the surface of the disk. Any defect with height higher than 50 angstroms will hit the flying head. The hit lead a failure at glide test.

The term "crt_qty_in" means the number of disks tests for the certification yield test, which are the same number of the glide passed disks.

The term "crt_yield" means certification yield, which is defined as the number of certification tests passed by disks divided by the glide passed disk number multiple by 100. Certification test is a test to test the magnetic property the disk. A head similar to the head in real drive flies on the surface of the disk with same fly height as for the glide head.

It writes and reads signal from the test surface. If the read signal too weak it indicates that the magnetic film is defective and the disk fails the certification test.

The term "cum_yield" means cumulative yield, which is defined as the product of glide yield and certification yield.

Table 1 shows that the cumulative yield for the conventional 4 station scrub wash machine is 74.88% while the cumulative yield for the novel 5 station scrub wash machine is 76.78%. This improvement of about 2% in cumulative yield is a significant improvement for decreasing scrap and producing substantial monetary savings. The number of the magnetic media produced annually is around 400 million for the industry at current. With an improvement in the cumulative yield of 1.5%, 6 million more good disks would be produced. As each disk costs about $6 to produce, the savings due to 1.5% increase in the cumulative yield would be about 36 million dollars. This savings is clearly substantial and directly related to the improvement in the disk scrub wash resulting from the embodiments of this invention.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A disk cleaning scrub module comprising a scrub lane and a plurality of brushes that rotates and scrub washes a plurality of same-diameter disks in the scrub lane, each of the disks operably supported by advance fingers so that respective edges of all the plurality of disks contactingly engage a drive belt and so that a ratio of disk-to-disk center distance to the disk diameter is greater than 1 and less than 1.6.

2. The disk cleaning scrub module of claim 1, wherein at least a portion of the brushes have a core that is a step core having two diameter sizes along the length of the core such that a larger diameter section of the brush operably engages one of the disks with comparatively greater force than a smaller diameter section of the brush during scrub wash of the disk by the brush.

3. The disk cleaning scrub module of claim 1, wherein the drive belt defines a groove sized to matingly engage respective edges of the plurality of disks.

4. The disk cleaning scrub module of claim 1, wherein a linear velocity of the drive belt and a rotation speed of the brushes are selectable such that rotation slippage of the disk on the drive belt is substantially eliminated.

5. The disk cleaning scrub module of claim 4, wherein the linear velocity of the drive belt and the rotation speed of the brushes are selectable by executing computer instructions stored in memory.

6. The disk cleaning scrub module of claim 1, further comprising a transfer chain supporting the advance fingers.

7. The disk cleaning scrub module of claim 1, wherein each of the advance fingers comprises a roller that, in turn, contactingly engages a respective one of the disks.

8. The disk cleaning scrub module of claim 7 wherein at least one of the advance fingers comprises the roller contactingly engaging a first disk and further comprises a second roller contactingly engaging a second disk.

9. A disk cleaning apparatus comprising a scrub lane and a brush that is selectively rotatable to scrub a disk operably supported in the scrub lane, the brush having a step core defined by two different diameter sizes wherein a larger diameter portion of the step core operably engages the disk with comparatively greater force than a smaller diameter portion of the step core during scrubbing.

10. The disk cleaning apparatus of claim 9 wherein the brush is characterized as a first brush engaging one side of the disk and further comprising a second brush defining a step core engaging an opposing side of the disk.

11. The disk cleaning apparatus of claim 10 wherein the larger diameter portions of the step cores oppose each other and the smaller diameter portions of the step cores oppose each other to operably impart rotation to the disk.

12. The disk cleaning apparatus of claim 9 wherein a plurality of disks of the same diameter D are operably supported in the scrub lane at a disk-to-disk center distance S and a ratio of S/D is greater than 1 and less than 1.6.

13. The disk cleaning apparatus of claim 9 further comprising a drive belt operably engaging an edge of the disk.

14. The disk cleaning apparatus of claim 13 wherein the drive belt defines a groove sized to matingly engage the edge of the disk in a close mating relationship.

15. The disk cleaning apparatus of claim 13 wherein a linear velocity of the drive belt and a rotation speed of the brush are selectable to substantially prevent rotation slippage of the disk on the drive belt.

16. The disk cleaning apparatus of claim 15 wherein the linear velocity of the drive belt and the rotation speed of the brush are selectable by executing computer instructions stored in memory.

17. The disk cleaning apparatus of claim 9 comprising a transfer chain supporting a plurality of advance fingers that, in turn, support the disk.

18. The disk cleaning apparatus of claim 17 wherein each of the advance fingers comprises a roller that, in turn, contactingly engages the disk.

19. The disk cleaning apparatus of claim 17 wherein a plurality of disks are operably supported in the scrub lane and at least one of the advance fingers comprises a first roller that, in turn, contactingly engages a first disk of the plurality of disks and further comprises a second roller that, in turn, contactingly engages a second disk of the plurality of disks.

20. A method of cleaning disks, comprising:
  supporting a plurality of disks in a scrub lane so that a ratio of disk-to-disk center distance to disk diameter is greater than 1 and less than 1.6;
  engaging each of the plurality of disks with a drive belt to selectively rotate each of the plurality of disks;
  engaging one of the disks with a selectively rotatable brush defining a step core so that a larger diameter portion of the step core imparts a comparatively greater force on the one of the disks than a smaller diameter portion of the step core; and
  selectively controlling a linear speed of the drive belt and a rotational speed of the brush to prevent slippage between the disk and the drive belt.

* * * * *